Aug. 11, 1959     J. W. ANDERSON     2,898,674
UNIVERSAL WINDSHIELD WIPER ARM REMOVER

Filed Jan. 25, 1957

INVENTOR.
JOHN W. ANDERSON
BY
Redrow & Recktenwald
ATTORNEYS

United States Patent Office 2,898,674
Patented Aug. 11, 1959

2,898,674

UNIVERSAL WINDSHIELD WIPER ARM REMOVER

John W. Anderson, Gary, Ind.

Application January 25, 1957, Serial No. 636,376

1 Claim. (Cl. 29—278)

This invention relates to a windshield wiper arm remover and more particularly to a universal windshield wiper arm remover specifically adapted for removing several different styles of windshield wiper arms.

Currently, there are many different styles of connections used for attaching a selected one of several different style windshield wiper arms to the drive shaft of a windshield wiper motor of an automotive vehicle. Obviously, this problem has presented innumerable difficulties in a service station wherein these various arms are removed for repair or replacement purposes. Under the present system, it is necessary for the service station attendant to carry a separate wrench for each type or style of wiper arm connection so that as many as three and four individual wrenches are being carried so as to save needless trips back and forth between the service station and the vehicle being worked upon.

It is, therefore, a principal object of this invention to overcome the above-noted disadvantages of the prior art and to provide a universal windshield wiper arm remover that is adapted to fit all of the current windshield wiper arm connection means known to be on the market.

It is another object of this invention to provide an improved wiper arm remover that is inexpensive to manufacture, efficient in use, universal in operation, light in weight and easily handled or stored.

It is still another object of this invention to provide an improved windshield wiper remover that can be manufactured by stamping or otherwise formed in one simple operation with a high degree of accuracy.

And still another object of this invention is to provide an improved windshield wiper arm remover that can be marketed in large quantities.

A still further object of the present invention is the provision of a specially constructed windshield wiper arm remover that is durable, simple in construction, and highly serviceable in use.

These and other objects and advantages of the invention will become apparent as the description of the same proceeds and the invention will be best understood from a consideration of the following detailed description taken in connection with the accompanying drawing forming part of the specification with the understanding, however, that the invention is not confined to any strict conformance with the showing of the drawing, but may be changed or modified so long as such changes or modifications mark no material departure from the salient features of the invention as expressed in the appended claim.

Figure 1:
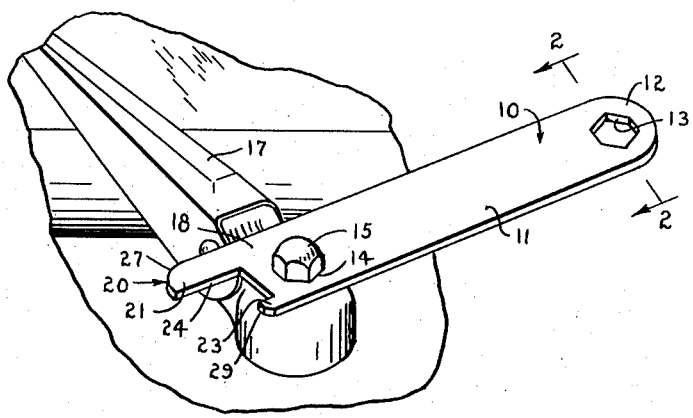
Figure 1 is a perspective view of my improved windshield wiper arm remover in position for removing one style of windshield wiper arm.
Figure 2:
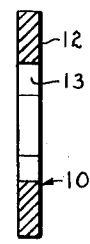
Figure 2 is a cross-sectional view taken along line 2—2 of Figure 1.

Referring to the drawing, wherein similar reference numerals refer to similar parts throughout the several views, the numeral 10 indicates generally a universal windshield wiper arm remover having an elongated thin body member 11, made of hardened metal such as tool steel or the like. The body member 11 has one rounded end portion 12 in the center of which is formed a hexagonally shaped aperture 13 of a particular cross-sectional dimension such as to be adapted to fit the hexagonal nut of one standard style of windshield wiper arm. Laterally spaced from said end portion 12 and situated near the other end of the tool is a second hexagonally shaped aperture 14 shown in Figure 3, of a different cross-sectional dimension from 13 such that a hexagonal nut 15 of a different size can be engaged by the remover 10 for disengaging a different style windshield wiper arm 17 from an automotive vehicle, such as illustrated in Figure 1.

The opposite end of the body member 11 from the rounded end 13 is denoted 18 in Figure 1 and has a different type of unfastening means 20 associated therewith which comprises an elongated projecting finger 21 extending from one part of said end portion and is disposed in the same common plane of the body member 11. Spaced from said finger 21 is a coacting dog member 23 extending from said end portion 18 in the same plane as said body member 11 and finger 21. The finger 21 and the dog member 23 each have face portions 24 and 25, respectively, lying substantially parallel to each other in spaced-apart relationship such that an element can be slipped between same for a purpose to be hereinafter described.

It will be noted that the finger 21 has a rounded edge portion 27 of such a character as to eliminate all sharp protruding corners that may, during use of the remover, accidentally mar the finish of an automobile as the remover is being placed on or removed from the head portion of a windshield wiper arm. The edge portion 29 of the dog member 23 is tapered along the outer edge so as to tie in with the one edge of the body member 11 in such a way as to guide the remover 10 into position on the wiper arm head.

Figure 3:
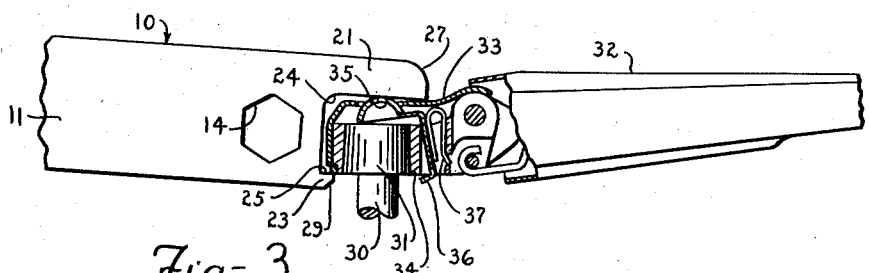
Figure 3 is a side elevational view with parts broken away of my universal windshield wiper arm remover being used to remove a different style of windshield wiper arm.
Figure 4:
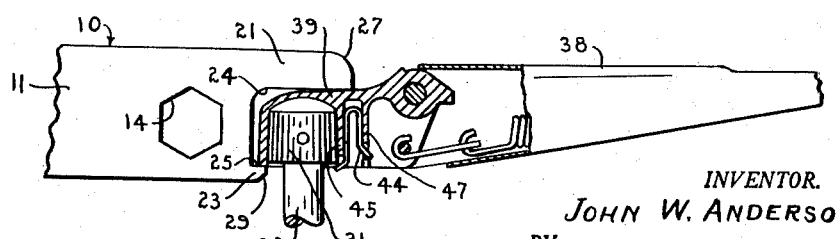
Figure 4 is a view similar to Figure 3 showing my improved arm remover in use on a different type of arm.

The operation of the above-described device, as applied specifically to the use of the just-described end portion 18, is best illustrated in Figures 3 and 4. In Figure 3 a style of windshield wiper arm is shown wherein a shaft 30 which is connected to the windshield wiper drive motor of an automotive vehicle has a serrated drum 31 keyed thereon. The wiper arm 32 has a head portion 33 which is constructed in such a way as to rigidly secure a serrated sleeve 34 therein. With the head portion 33 and sleeve 34 pressed down onto the drum 31 the serrations prevent rotation of one relative to the other. The holding and releasing portion of the head 33 includes an L-shaped member having a button actuator 35 on one leg and an inwardly bent lip 36 on the other leg. The lip 36 is resiliently held in position under a segment of the sleeve 34 and drum 31 by means of the spring 37. To release the arm 32 from the shaft, the actuator 35 is depressed so that the lower depending lip 36 is disengaged from under the serrated sleeve 34 and serrated from drum 31 thereby releasing the connection and permitting axial movement of the arm relative to the shaft. However, it has been found that a great deal of difficulty arises at this point since the serrations on the sleeve and drum bite into the metal of each other in such a way that it becomes extremely difficult to separate the two. Heretofore, a screw driver has been inserted between the head of the arm and the cowl of the automobile for prying the arm off the shaft. This resulted in damage to the automobile finish. To facilitate removal of the arm from the shaft, the remover 10 is employed whereby the face portion 25 of the dog member 29 is engaged under the edge portion of the serrated sleeve 34 while simultaneously the face portion 24 of the finger 21 is engaged with the exposed portion of the actuator 35 whereby lifting the end portion 12 of the body member 11 relative to the arm 32 will depress the actuator 35 and will simultaneously raise the serrated sleeve 34 and head 33 axially away from the serrated drum 31 and shaft 30 whereby the arm 32 is loosened from the shaft so that it may be removed for repair or replacement.

As shown in Figure 4, still a fourth type of windshield wiper arm 38 is illustrated wherein a different type of connection is shown between the one-piece head 39 of the wiper arm 38 and the serrated drum 31 of the shaft 30 of an oscillatable windshield wiper motor, not shown. An inverted U-shaped spring 44 is seated in an aperture 47 in the head 39 and has one end adapted to engage under a serrated portion 45 of the head 39 and under a portion of the coacting serrated drum 31 on the shaft 30 so as to hold the wiper arm 38 assembled on said shaft. By engaging the face 25 of the dog 23 under one portion of said head 39 and bearing the face portion 25 of the finger 21 against the upper surface of said head 39 and raising up on the end portion 12 of the body member 11 the head 39 will be lifted until the spring 44 slides past the engaged portions of the serrated drum 31 whereby the arm can be easily removed from the shaft 30.

It will be obvious at this point that I have invented a new and improved windshield wiper arm remover that is universal in character, efficient in use, and inexpensive to manufacture. Using my improved arm remover, a service station attendant can easily carry the remover in his pocket or hang it conveniently in the service area where, no matter what style wiper arm appears on a vehicle being worked upon, this universal remover can be used for removing the arm for service. Also, since the two hexagonal openings 13 and 14 are generally of a standard size, the remover can be used to perform other simple service tasks on a motor vehicle or the like.

In the drawings and specification, there has been set forth a preferred embodiment of the invention and although specific terms are employed they are used in a generic and descriptive sense only and not for purposes of limitation, the scope of the invention being defined in the claim.

I claim:

A tool for withdrawing the socketed head of a wiper arm from its mounting upon the end of an oscillatory shaft comprising an elongated, thin, flat handle member; one end of said member including means for withdrawing said head axially from said shaft; said means consisting of a finger extending from said one end parallel with the axis of said member and adapted to extend substantially across the upper surface of said head, and a dog extending a shorter distance from said end in spaced relationship to said finger, said finger and dog lying in the plane of said member; the opposed edges of said finger and dog being parallel and the space therebetween being substantially equal to the thickness of said head so that the finger may engage the upper surface of said head with the dog fitting beneath the lower edge of said head.

References Cited in the file of this patent
UNITED STATES PATENTS

| | | |
|---|---|---|
| 706,911 | Dunham | Aug. 12, 1902 |
| 1,454,320 | Jenkins | May 8, 1923 |
| 1,609,732 | McLaughlin | Dec. 7, 1926 |

FOREIGN PATENTS

| | | |
|---|---|---|
| 1,022,607 | France | Dec. 17, 1952 |